United States Patent
Tsen et al.

(10) Patent No.: US 11,747,868 B2
(45) Date of Patent: Sep. 5, 2023

(54) UNIBODY BASE CHASSIS TOP COVER FOR A PORTABLE INFORMATION HANDLING SYSTEM

(71) Applicant: Dell Products L.P., Round Rock, TX (US)

(72) Inventors: Chiu-Jung Tsen, Hsinchu (TW); Hsu-Feng Lee, Taipei (TW); Sajjad S. Ahmed, Austin, TX (US); Gerald R. Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/537,573

(22) Filed: Nov. 30, 2021

(65) Prior Publication Data

US 2023/0168721 A1  Jun. 1, 2023

(51) Int. Cl.
  *G06F 1/16* (2006.01)
  *G06F 3/01* (2006.01)
  *G06F 3/0354* (2013.01)

(52) U.S. Cl.
  CPC .............. *G06F 1/169* (2013.01); *G06F 3/016* (2013.01); *G06F 3/03547* (2013.01)

(58) Field of Classification Search
  CPC ....... G06F 1/169; G06F 3/016; G06F 3/03547
  See application file for complete search history.

(56) References Cited

U.S. PATENT DOCUMENTS

| | | | | |
|---|---|---|---|---|
| 11,009,953 | B2* | 5/2021 | Hashimoto | G06F 3/0202 |
| 2002/0033795 | A1* | 3/2002 | Shahoian | G06F 3/03547 345/156 |
| 2009/0322683 | A1* | 12/2009 | Tsuji | G06F 3/03547 345/173 |
| 2012/0113009 | A1* | 5/2012 | Hotelling | G06F 3/04883 345/173 |
| 2012/0188192 | A1* | 7/2012 | Sano | G06F 3/011 345/173 |
| 2012/0232780 | A1* | 9/2012 | Delson | A63F 13/285 340/407.1 |
| 2016/0026248 | A1* | 1/2016 | Petrignani | G06F 3/011 345/156 |
| 2017/0153703 | A1* | 6/2017 | Yun | G06F 3/016 |
| 2018/0164910 | A1* | 6/2018 | Ent | G06F 3/018 |
| 2020/0192484 | A1* | 6/2020 | Lehmann | G06F 3/03547 |
| 2022/0362663 | A1* | 11/2022 | Bryan | A63F 13/54 |

\* cited by examiner

*Primary Examiner* — Ariel A Balaoing
(74) *Attorney, Agent, or Firm* — Terrile, Cannatti & Chambers; Stephen A. Terrile

(57) ABSTRACT

A main housing portion of a portable information handing system. The main housing portion includes: a bottom cover portion; and, a top cover portion coupled to the bottom cover portion, the top cover portion comprising a full palm rest trackpad, the full palm rest trackpad comprising a touch printed circuit board; a sensor film portion electrically coupled to the touch printed circuit board; and, a plurality of piezo components extending across a width of the full palm rest trackpad, the plurality of piezo components being electrically coupled to the touch printed circuit board, the plurality of piezo components, each of the plurality of piezo components performing a haptic function.

18 Claims, 7 Drawing Sheets

UNIBODY BASE CHASSIS TOP COVER FOR A PORTABLE INFORMATION HANDLING SYSTEM

BACKGROUND OF THE INVENTION

Field of the Invention

The present invention relates to information handling systems. More specifically, embodiments of the invention relate to a base chassis top cover for a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a full palm rest trackpad, comprising: a touch printed circuit board; a sensor film portion electrically coupled to the touch printed circuit board; and, a plurality of piezo components extending across a width of the full palm rest trackpad, the plurality of piezo components being electrically coupled to the touch printed circuit board, the plurality of piezo components, each of the plurality of piezo components performing a haptic function.

In another embodiment the invention relates to main housing portion of a portable information handling system, comprising: a bottom cover portion; and, a top cover portion coupled to the bottom cover portion, the top cover portion comprising a full palm rest trackpad, the full palm rest trackpad comprising a touch printed circuit board; a sensor film portion electrically coupled to the touch printed circuit board; and, a plurality of piezo components extending across a width of the full palm rest trackpad, the plurality of piezo components being electrically coupled to the touch printed circuit board, the plurality of piezo components, each of the plurality of piezo components performing a haptic function.

In another embodiment the invention relates to an information handling system comprising: a processor; a data bus coupled to the processor; and an information handling system chassis housing, the housing comprising a base chassis, the base chassis housing the processor, the base chassis comprising a bottom cover portion; and, a top cover portion coupled to the bottom cover portion, the top cover portion comprising a full palm rest trackpad, the full palm rest trackpad comprising a touch printed circuit board; a sensor film portion electrically coupled to the touch printed circuit board; and, a plurality of piezo components extending across a width of the full palm rest trackpad, the plurality of piezo components being electrically coupled to the touch printed circuit board, the plurality of piezo components, each of the plurality of piezo components performing a haptic function.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various aspects of the present disclosure include an appreciation that a portable information handling system base chassis can include a full palm rest size trackpad. Various aspects of the present disclosure include an appreciation that it would be desirable to provide localized haptic feedback for a full palm rest size trackpad as compared to known systems which only provide global haptic that vibrates the entire trackpad. Accordingly, a portable information handling system which includes a unibody base chassis top portion is disclosed which addresses these issues.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
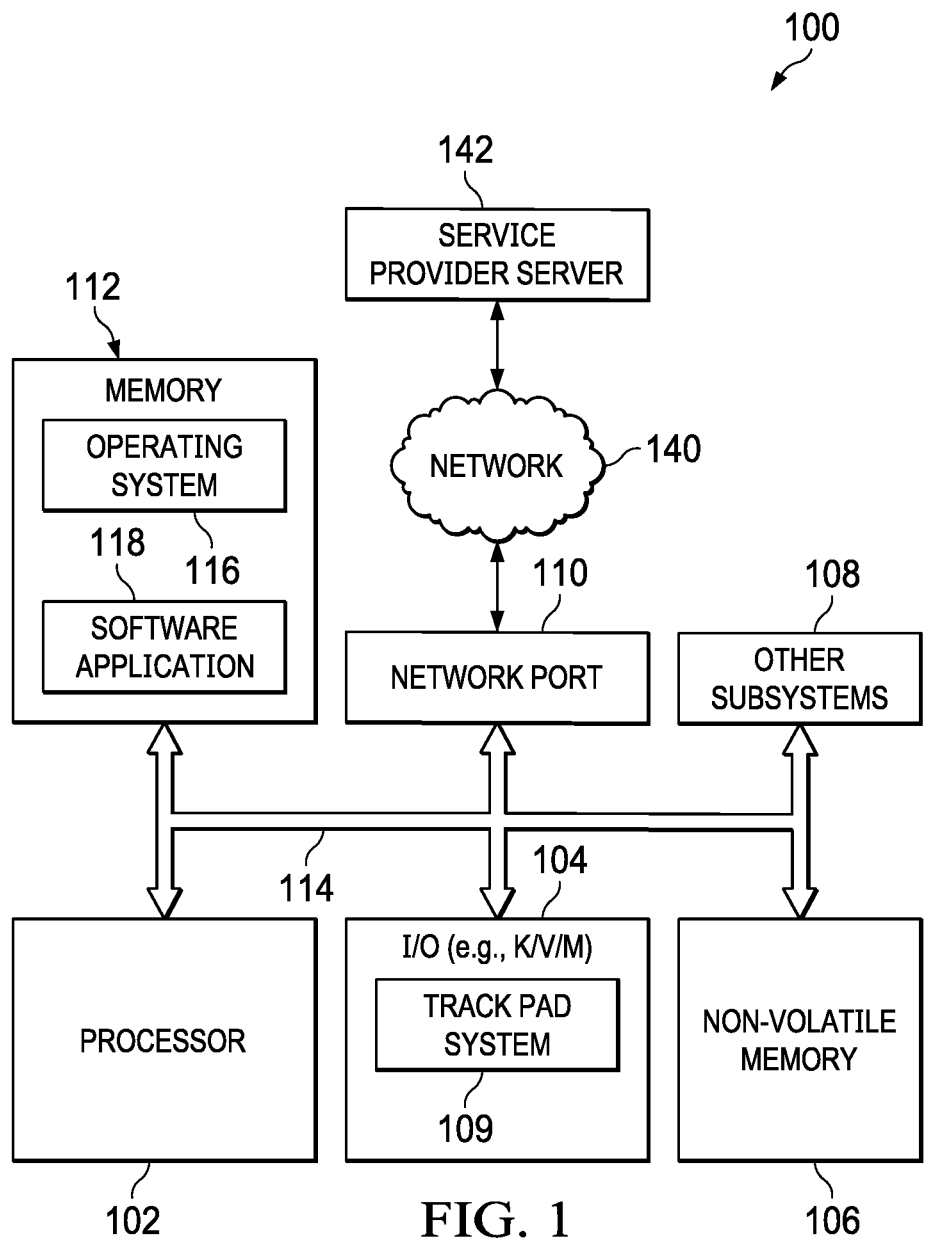
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In certain embodiments, the I/O devices 104 include a trackpad system 109. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
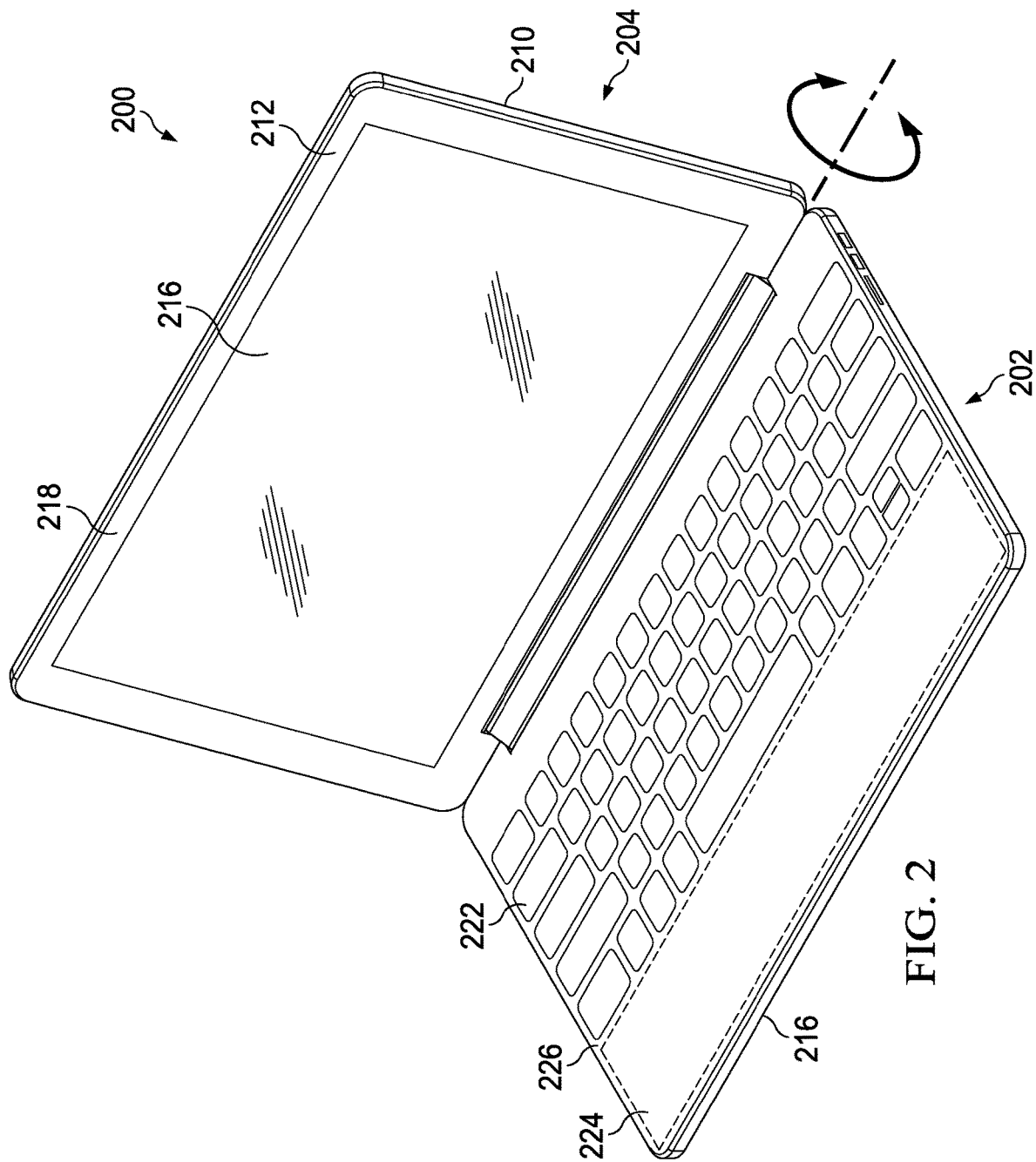
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 216 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, the C-cover 214 includes a palm rest portion 226. In certain embodiments, the palm rest portion 226 is contiguous with the keyboard 222. In certain embodiments, the trackpad 224 is a full palm rest size trackpad. For the purposes of this disclosure a full palm rest size trackpad is a trackpad which extends substantially (e.g., +/−20%) across the width of the palm rest portion of the C-cover and substantially (e.g., +/−20%) across the depth of the palm rest portion of the C-cover. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 210 forms a top outer protective shell, or a portion of a lid, for the information handling system 200, while the D-cover 216 forms a bottom outer protective shell, or a portion of a base, for the information handling system. When in the fully closed configuration, the A-cover 210 and the D-cover 216 would be substantially parallel to one another.

In some embodiments, both the A-cover 210 and the D-cover 216 may be comprised entirely of metal. In some embodiments, the A-cover 210 and D-cover 216 may include both metallic and plastic components. For example, plastic components that are radio-frequency (RF) transparent may be used to form a portion of the C-cover 214.

In various embodiments, the display chassis 204 may be movably connected to a back edge of the base chassis 202 via one or more hinges. In this configuration, the hinges allow the display chassis 204 to rotate from and to the base chassis 202 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the display chassis 204 with regard to the base chassis 202, for example up to 180° rotation arc. In other embodiments the information handling system 200 may be a convertible information handling system with full rotation to a tablet configuration.

Figure 3:
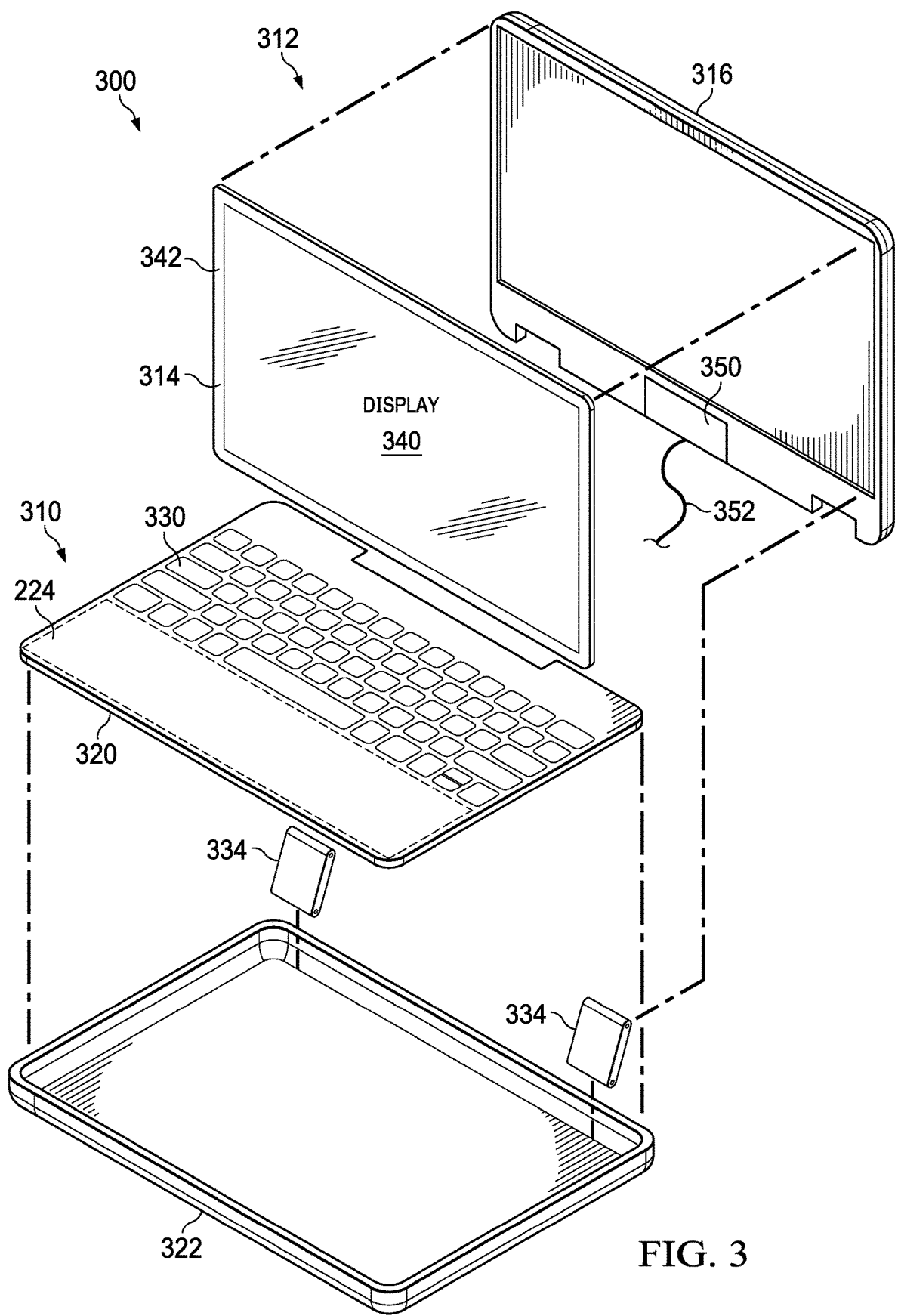
FIG. 3 shows a blown-up view of a portable information handling system.

FIG. 3 shows a blown-up view of a portable information handling system 300 having rotationally—coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 212) and a rear display cover portion 316 (which includes the A-Cover 210). The top cover portion 320 may include an integrated keyboard 330 or other I/O devices, such as a trackpad 332 or microphone (not shown). In various embodiments, the keyboard 330 may be mounted to the top of the C-Cover of the main housing portion 310. In various embodiments, the keyboard 330 may be mounted to the underside of the C-Cover of the main housing portion 310.

Lid housing portion 312 is rotationally coupled to main housing portion 310 via at least one hinge assembly 334. Lid housing portion 312 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 312 such that bezel may be narrow in size (e.g., less than 10 millimeters) on the edges. For example, display 340 is an infinity display with narrow bezels on the top and sides of lid housing portion 312 in the embodiment shown in FIG. 3. In certain embodiments, the side bezel is less than 4 mm (+/−10%) and the top bezel is less than 6 mm (+/−10%).

Lid housing portion 312 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 312 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
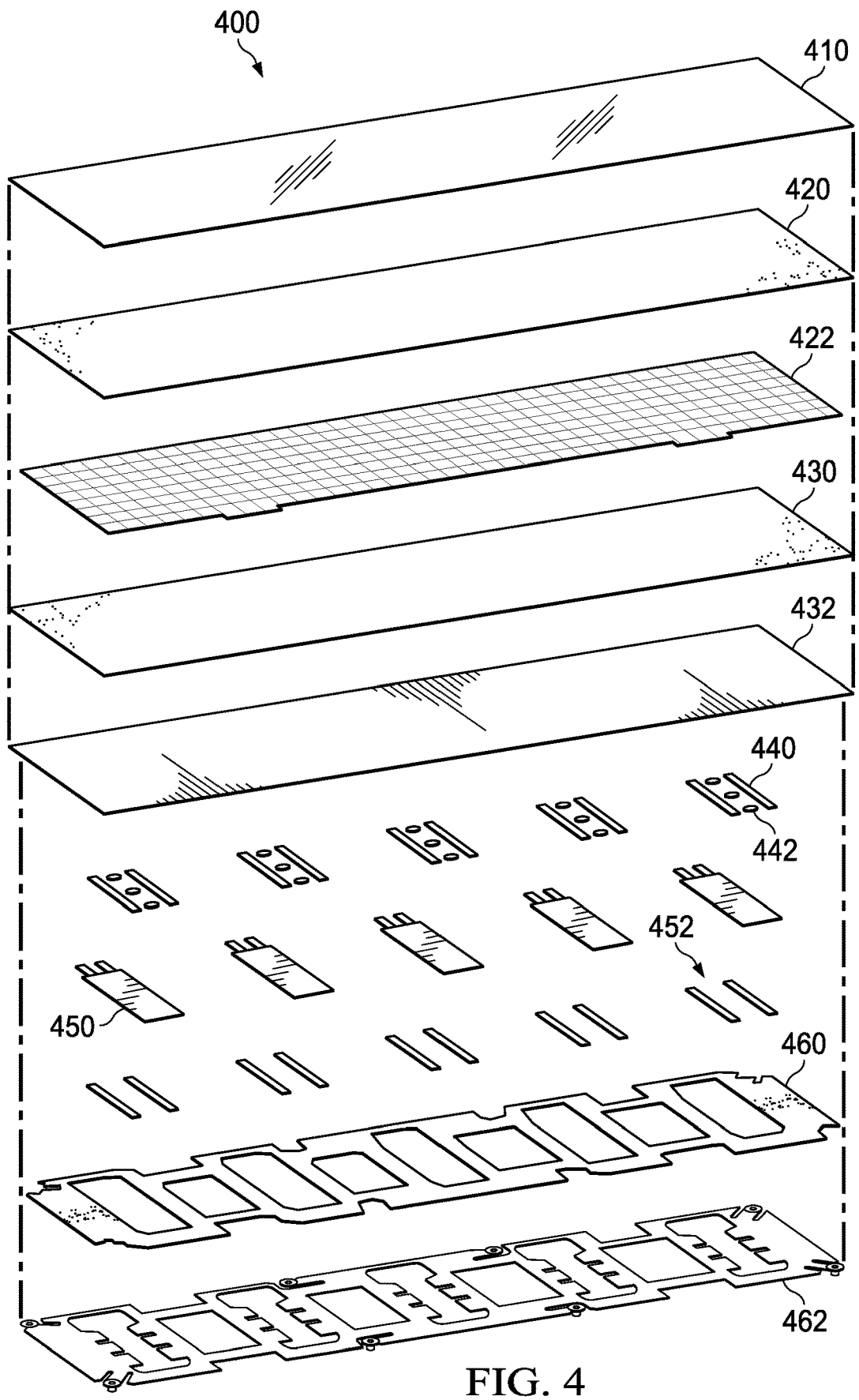
FIG. 4 shows an exploded view of a haptic full palm rest trackpad.

FIG. 4 shows an exploded view of a haptic full palm rest trackpad 400. More specifically, the haptic full palm rest track pad includes a top glass portion 410, a sensor film adhesive portion 420, a sensor film portion 422, a touch printed circuit board (PCB) adhesive 430, a touch printed circuit board 432, a plurality of printed circuit board polyester film components 440, a plurality of piezo adhesion components 442, a plurality of piezo components 450, a plurality of piezo polyester film components 452, a trackpad bracket adhesive 460 and a piezo support and mounting bracket 462.

In certain embodiments, each piezo component 450 generates an electrical signal in response to pressure. In certain embodiments, each piezo component 450 includes a flexible polymer film which provides localized bodily sensations and tactile effects. In certain embodiments, each piezo component 450 includes one or more piezo devices. In certain embodiments, each piezo device 450 includes a piezoelectric haptic actuator. In certain embodiments, each piezo component 450 performs a haptic function. As used herein, a haptic function may be defined as creating an experience of touch by providing a force (e.g., a vibration) in response to interaction with a portion of the full palm rest trackpad. In certain embodiments, each piezo component provides a vibration response to touch. In certain embodiments, the force is location specific. In certain embodiments, the force corresponds to the location of an interaction with the full palm rest trackpad.

In certain embodiments, the touch printed circuit board 432 and the flexible printed circuit board of each piezo component 450 includes the circuitry to provide a closed loop haptic control operation for controlling the piezo components 450. In certain embodiments, the sensor film portion 422 is electrically coupled to the touch printed circuit board 432. In certain embodiments, the piezo components 450 are electrically coupled with the touch printed circuit board 432. In certain embodiments, the full palm rest trackpad 400 includes an odd number of piezo components 450. In certain embodiments, the full palm rest trackpad 400 includes five piezo components 450. In certain embodiments, one of the piezo components 450 is located substantially (e.g., +/−20%) in the center of the width of the full palm rest trackpad 400.

In certain embodiments, the plurality of printed circuit board polyester film components 440 and the plurality of piezo polyester film components 452 are used to provide an electrical insulation function. In certain embodiments, the plurality of printed circuit board polyester film components 440 are adhered to the touch printed circuit board 432. In certain embodiments, the plurality of piezo polyester film components 452 are adhered to the piezo support and mounting bracket 462. In certain embodiments, the plurality of printed circuit board polyester film components 440 and the plurality of piezo polyester film components 452 are available under the trade designation Mylar.

In certain embodiments, the piezo adhesion components 442 each include three circular portions for a respective piezo component 450. In certain embodiments, the piezo adhesion components 442 are used to adhere the respective piezo components 450 to the touch printed circuit board 432. In certain embodiments, the three circular portions facilitate uniform haptic feedback by the piezo component to which the piezo adhesion component is adhered. In certain embodiments, the quantity and shape of the piezo adhesion components can vary based on the piezo components 450 to which the piezo adhesion component is adhered.

Figure 5:
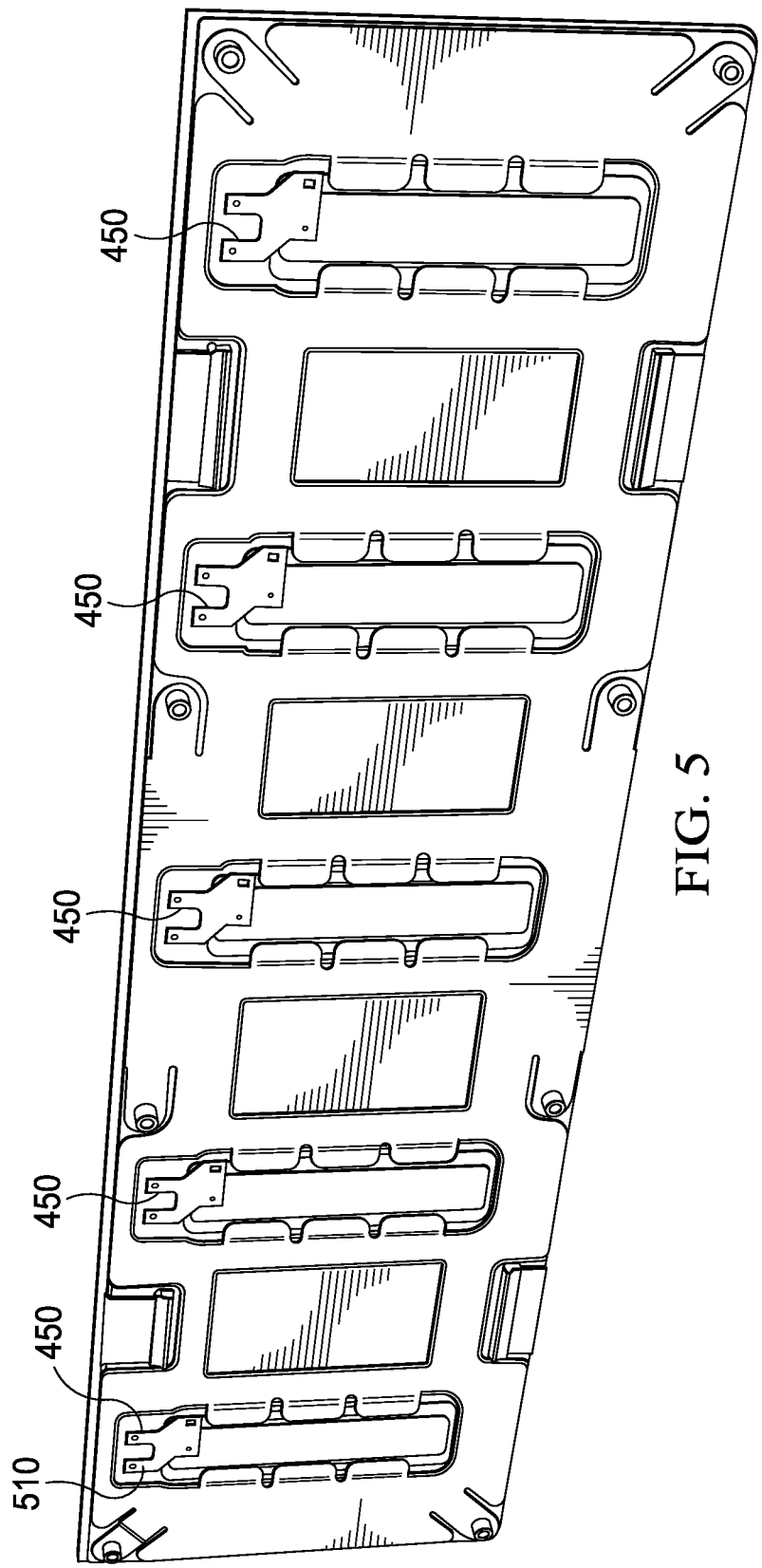
FIG. 5 shows a perspective view of a portion of a haptic full palm rest trackpad.

FIG. 5 shows a perspective view of a portion of a haptic full palm rest trackpad 500. More specifically, the full palm rest trackpad 500 includes a plurality of piezo components 450. Each of the plurality of piezo components 450 includes a respective connector portion 510. In various embodiments, the respective connection portions 510 electrically couple a piezo component 450 to the touch printed circuit board 432.

Figure 6:
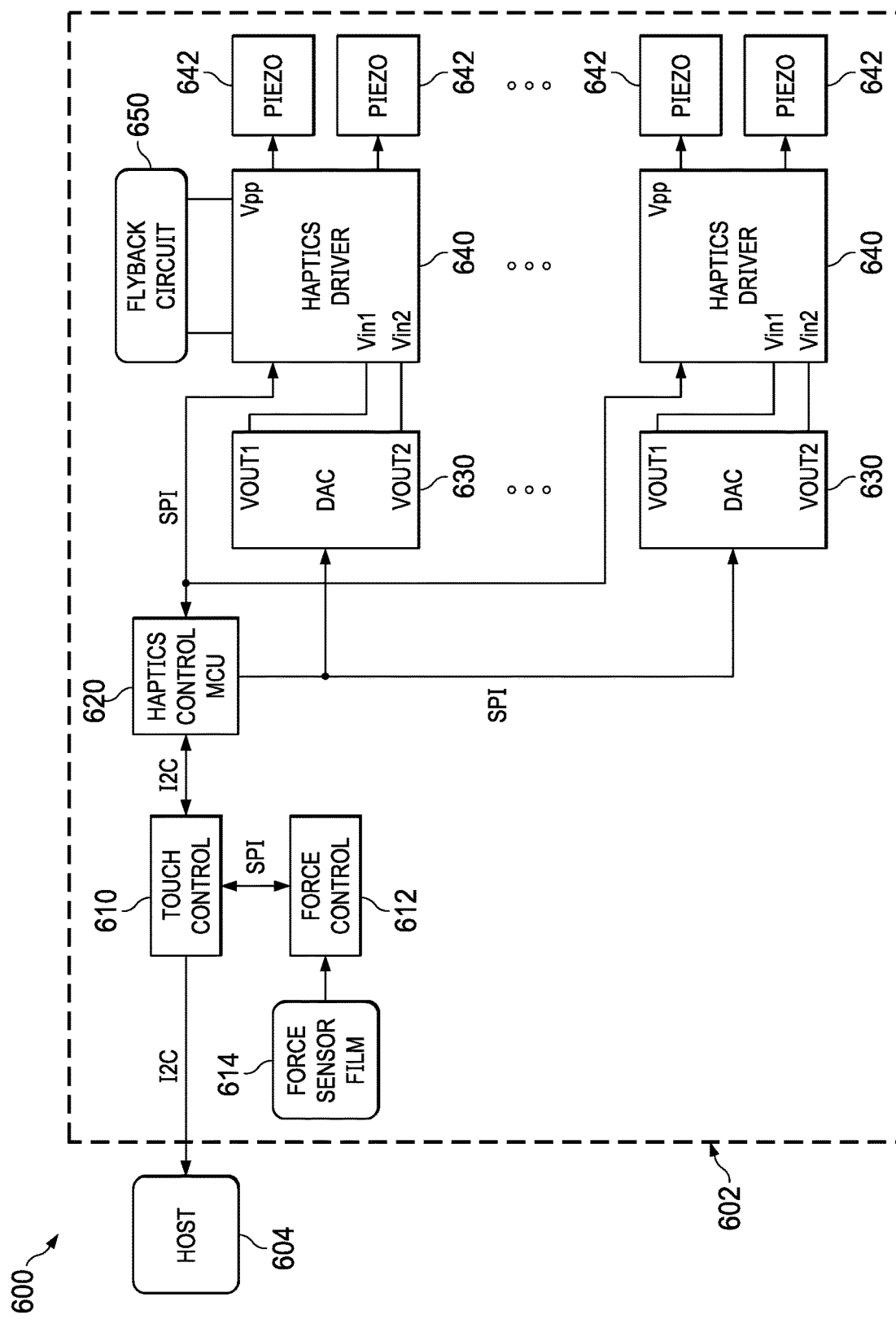
FIG. 6 shows a block diagram of a haptic trackpad system.

FIG. 6 shows a block diagram of a haptic trackpad environment 600. The haptic trackpad environment 600 includes a haptic trackpad system 602 and a host 604. More specifically, the haptic trackpad system 602 includes some or all of a touch control circuit 610, a force control circuit 612, a force sensor film 614, a haptic micro control unit 620, a plurality of digital to analog converters 630, a plurality of haptics drivers 640, a plurality of piezo components 642, and a flyback circuit 650. In certain embodiments, host 604 corresponds to processor 102. In certain embodiments, the force sensor film 614 corresponds to sensor film portion 422.

In certain embodiments, the piezo components 642 correspond to piezo components 450.

The touch control circuit 610 is coupled with the force control circuit 612, the haptic micro control unit 620 and the host 604. The force control circuit is also coupled with the force sensor film 614. The micro control unit is also coupled to the digital to analog converters 630 and the haptics drivers 640. Each of the plurality of digital to analog converters 630 is coupled to a respective haptics driver 640. Each of the plurality of haptics drivers 640 is coupled to one or more piezo components 642 as well as to the flyback circuit 650. In certain embodiments, the flyback circuit 650 is used to boost the voltage provided to each piezo component 642. In certain embodiments, the flyback circuit 650 boosts the voltage from 5V to 250V. In certain embodiments, the flyback circuit 650 is coupled to the haptics drivers 640 in series.

In certain embodiments, the haptics drivers 640 each include a dual amplifier for driving a pair of piezo components 642. In certain embodiments, each haptics driver 640 includes dual 250V operational amplifiers. The operational amplifiers drive respective piezo components 642 (i.e., haptic actuators) at 225V with 40 mA minimum source/sink current.

Figure 7:
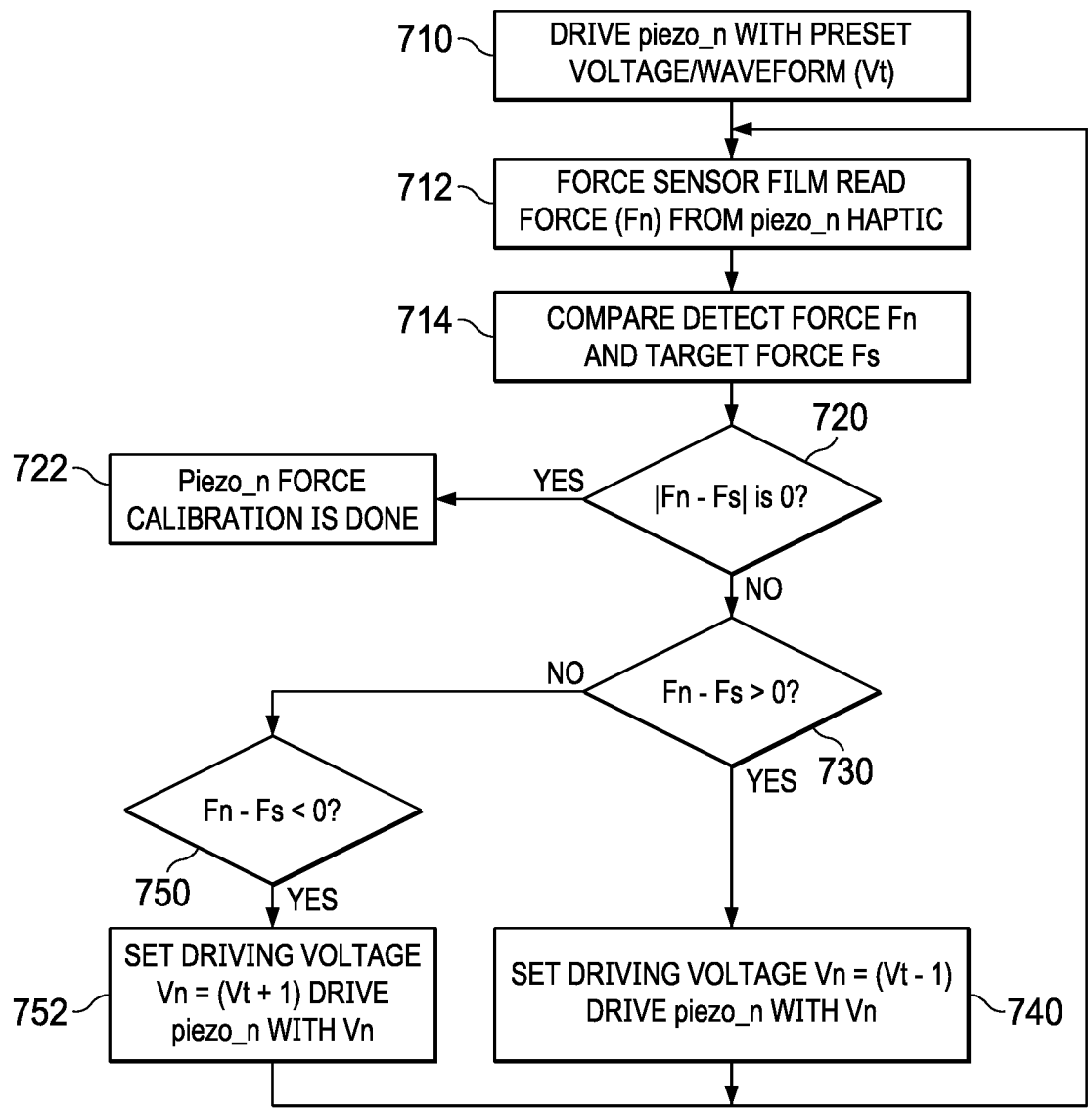
FIG. 7 shows a flow chart of a haptic strength control operation.

FIG. 7 shows a flow chart of a haptic strength control operation 700. As used herein, a haptic strength control operation controls a force exerted by a respective piezo component.

More specifically, the haptic strength control operation 700 starts by driving a particular piezo (e.g., piezo_n, piezo component 642) with a preset voltage waveform (Vt) at step 710. Next, at step 712, a force sensor film (e.g., force sensor film 614) reads a force (Fn) which is generated by the piezo based upon the applied voltage (Vt). Next, at step 714 the detected force Fn is compared to a target force (Fs). In certain embodiments, the comparison is performed via a combination of the force control circuit 612 and the haptic micro control unit 620.

Next at step 720, the operation 700 determines whether the detected force minus the target force is substantially (e.g., +/−10%) equal to zero. If the detected force minus the target force is substantially equal to zero, then the calibration of the particular piezo component completes at step 722.

If the detected force minus the target force is not substantially equal to zero, then the operation proceeds determine whether the detected force minus the target force is greater than zero at step 730. If the detected force minus the target force is greater than zero, then the operation sets the driving voltage to the threshold voltage minus 1 (Vn=(Vt−1) and drives the particular piezo component with the new driving voltage at step 740. After driving the particular piezo component with the new driving voltage at steps 740, the operation 700 returns to step 712 to read the force generated by the particular piezo component.

If the detected force minus the target force is not greater than zero, then the operation 700 determines whether the detected force minus the target force is less than zero at step 750. If the detected force minus the target force is less than zero, then the operation 700 sets the driving voltage to the threshold voltage plus 1 (Vn=(Vt+1) and drives the particular piezo component with the new driving voltage at step 752. After driving the particular piezo component with the new driving voltage at steps 752, the operation 700 returns to step 712 to read the force generated by the particular piezo component. By returning to step 712 and repeating the operation until the detected force minus the target force is substantially (e.g., +/−10%) equal to zero, the haptic strength control operation uses closed loop feedback to control the force exerted by the particular piezo component.

The haptic strength control operation 700 is repeated for some or all of the plurality of piezo components of the full palm rest trackpad.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A full palm rest trackpad, the full palm rest trackpad extending substantially across a width of a palm rest portion of a top cover portion of a main housing portion of a portable information handling system, comprising:
   a touch printed circuit board;
   a sensor film portion electrically coupled to the touch printed circuit board; and,
   a plurality of piezo components extending across a width of the full palm rest trackpad from a left edge of the full palm rest trackpad to a right edge of the full palm rest trackpad, each of the plurality of piezo components extending across a depth of the full palm rest trackpad from a front edge of the full palm rest trackpad to a rear edge of the full palm rest trackpad, the plurality of piezo components being electrically coupled to the touch printed circuit board, each of the plurality of piezo components performing a haptic function.

2. The full palm rest trackpad of claim 1, wherein:
   the plurality of piezo components consist of an odd number of piezo components.

3. The full palm rest trackpad of claim 2, wherein:
   at least one of the plurality of piezo components is located substantially in the center of the width of the full palm rest trackpad.

4. The full palm rest trackpad of claim 1, wherein:
   a haptic strength control operation is performed on each of the plurality of piezo components, the haptic strength control operation controlling a force exerted by each of the plurality of piezo components.

5. The full palm rest trackpad of claim 4, wherein:
   the force exerted by each of the plurality of piezo components is controlled via closed loop feedback.

6. The full palm rest trackpad of claim 1, wherein:
   each piezo component comprises a respective piezoelectric haptic actuator.

7. A main housing portion of a portable information handing system, comprising:
   a bottom cover portion; and,
   a top cover portion coupled to the bottom cover portion, the top cover portion comprising a full palm rest trackpad, the full palm rest trackpad extending substantially across a width of a palm rest portion of the top cover portion, the full palm rest trackpad comprising
   a touch printed circuit board;
   a sensor film portion electrically coupled to the touch printed circuit board; and, a plurality of piezo components extending across a width of the full palm rest trackpad from a left edge of the full palm rest trackpad to a right edge of the full palm rest trackpad, each of the plurality of piezo components extending across a depth of the full palm rest trackpad from a front edge of the full palm rest trackpad to a rear edge of the full palm rest trackpad, the plurality of piezo components being electrically coupled to the touch printed circuit board, each of the plurality of piezo components performing a haptic function.

8. The main housing portion of claim 7, wherein:
the plurality of piezo components consist of an odd number of piezo components.

9. The main housing portion of claim 8, wherein:
at least one of the plurality of piezo components is located substantially in the center of the width of the full palm rest trackpad.

10. The main housing portion of claim 7, wherein:
a haptic strength control operation is performed on each of the plurality of piezo components, the haptic strength control operation controlling a force exerted by each of the plurality of piezo components.

11. The main housing portion of claim 10, wherein:
the force exerted by each of the plurality of piezo components is controlled via closed loop feedback.

12. The main housing portion of claim 1, wherein:
each piezo component comprises a respective piezoelectric haptic actuator.

13. An information handling system comprising:
a processor;
a data bus coupled to the processor; and
an information handling system chassis housing, the housing comprising
a base chassis, the base chassis housing the processor, the base chassis comprising
a bottom cover portion; and,
a top cover portion coupled to the bottom cover portion, the top cover portion comprising a full palm rest trackpad, the full palm rest trackpad extending substantially across a width of a palm rest portion of the top cover portion, the full palm rest trackpad comprising
a touch printed circuit board;
a sensor film portion electrically coupled to the touch printed circuit board; and,
a plurality of piezo components extending across a width of the full palm rest trackpad from a left edge of the full palm rest trackpad to a right edge of the full palm rest trackpad, each of the plurality of piezo components extending across a depth of the full palm rest trackpad from a front edge of the full palm rest trackpad to a rear edge of the full palm rest trackpad, the plurality of piezo components being electrically coupled to the touch printed circuit board, each of the plurality of piezo components performing a haptic function.

14. The information handling system of claim 13, wherein:
the plurality of piezo components consist of an odd number of piezo components.

15. The information handling system of claim 14, wherein:
at least one of the plurality of piezo components is located substantially in the center of the width of the full palm rest trackpad.

16. The information handling system of claim 13, wherein:
a haptic strength control operation is performed on each of the plurality of piezo components, the haptic strength control operation controlling a force exerted by each of the plurality of piezo components.

17. The information handling system of claim 16, wherein:
the force exerted by each of the plurality of piezo components is controlled via closed loop feedback.

18. The information handling system of claim 11, wherein:
each piezo component comprises a respective piezoelectric haptic actuator.

* * * * *